(12) United States Patent
Maeda (10) Patent No.: US 8,249,092 B2
(45) Date of Patent: Aug. 21, 2012

(54) COMMUNICATION DEVICE, COMMUNICATION SYSTEM, AND COMMUNICATION METHOD PERFORMING COMMUNICATION USING A PLURALITY OF SIGNALS HAVING DIFFERENT FREQUENCIES

(75) Inventor: Junichi Maeda, Tokyo (JP)

(73) Assignee: Sumitomo Electric Networks, Inc., Tokyo (JP)

(*) Notice: Subject to any disclaimer, the term of this patent is extended or adjusted under 35 U.S.C. 154(b) by 523 days.

(21) Appl. No.: 11/521,611

(22) Filed: Sep. 15, 2006

(65) Prior Publication Data

US 2007/0206625 A1  Sep. 6, 2007

(30) Foreign Application Priority Data

Mar. 1, 2006  (JP) ................... 2006-054920

(51) Int. Cl.
   *H04J 3/16* (2006.01)
(52) U.S. Cl. .................... 370/437; 375/260
(58) Field of Classification Search .......... 370/437, 370/232, 484, 494, 220, 340, 468, 295, 203; 714/774, 751, 701, 755; 375/222, 229, 233, 375/260, 231, 346, 265, 220; 379/416; 725/106
   See application file for complete search history.

(56) References Cited

U.S. PATENT DOCUMENTS

| | | | | |
|---|---|---|---|---|
| 5,479,447 A | * | 12/1995 | Chow et al. ............... | 375/260 |
| 5,534,912 A | * | 7/1996 | Kostreski ................. | 725/106 |
| 5,812,599 A | * | 9/1998 | Van Kerckhove ......... | 375/260 |
| 5,852,633 A | * | 12/1998 | Levin et al. ............... | 375/130 |
| 6,069,879 A | * | 5/2000 | Chatter ..................... | 370/295 |
| 6,084,906 A | * | 7/2000 | Kao et al. .................. | 375/220 |
| 6,084,917 A | | 7/2000 | Kao et al. | |
| 6,130,882 A | * | 10/2000 | Levin ....................... | 370/252 |
| 6,219,378 B1 | * | 4/2001 | Wu ........................... | 375/231 |
| 6,389,062 B1 | * | 5/2002 | Wu ........................... | 375/222 |

(Continued)

FOREIGN PATENT DOCUMENTS

EP  1 569 402  8/2005

(Continued)

OTHER PUBLICATIONS

Telesyn, Architectures for Video over ADSL IP & ATM, 2003.*

(Continued)

*Primary Examiner* — Michael Thier
*Assistant Examiner* — Vincelas Louis
(74) *Attorney, Agent, or Firm* — McDermott Will & Emery LLP (57) ABSTRACT

A communication device includes: a reception unit receiving communication signals having different frequencies, where the communication signals include logic channels, from another communication device; a measurement unit measuring line states of the received communication signals; a communication signal allocation unit allocating one or more communication signals to each of the logic channels; a margin setting unit setting a margin value for each logic channel and deciding the margin value set for the corresponding logic channel as a margin value of the communication signal; a communication speed decision unit deciding a communication speed of each of the communication signals such that an error rate of each of the communication signals is less than a prescribed value in line states degraded by the margin value of the communication signal from the measured line states; and a transmission unit notifying the other communication device of an allocation result of the communication signal and the decided communication speed.

7 Claims, 7 Drawing Sheets

U.S. PATENT DOCUMENTS

| | | | |
|---|---|---|---|
| 6,424,636 B1 * | 7/2002 | Seazholtz et al. | 370/295 |
| 6,459,678 B1 | 10/2002 | Herzberg | |
| 6,625,777 B1 * | 9/2003 | Levin et al. | 714/774 |
| 7,032,138 B2 * | 4/2006 | Cameron | 714/701 |
| 7,065,151 B2 * | 6/2006 | Lin | 375/285 |
| 7,339,881 B1 * | 3/2008 | Abousleman et al. | 370/203 |
| 7,421,044 B2 * | 9/2008 | Cameron et al. | 375/340 |
| 7,457,993 B2 * | 11/2008 | Modlin | 714/701 |
| 2003/0202612 A1 * | 10/2003 | Halder et al. | 375/265 |
| 2004/0071240 A1 * | 4/2004 | Betts | 375/346 |
| 2006/0107174 A1 * | 5/2006 | Heise | 714/755 |
| 2006/0126749 A1 * | 6/2006 | Armour et al. | 375/260 |
| 2006/0153285 A1 * | 7/2006 | Modlin | 375/222 |
| 2007/0047733 A1 * | 3/2007 | Bremer et al. | 379/416 |
| 2007/0110176 A1 * | 5/2007 | Wu et al. | 375/260 |
| 2008/0123690 A1 * | 5/2008 | Wang et al. | 370/468 |

FOREIGN PATENT DOCUMENTS

| | | |
|---|---|---|
| JP | 2000-244587 | 9/2000 |
| JP | 2004-007729 | 1/2004 |
| JP | 2005-027294 | 1/2005 |

OTHER PUBLICATIONS

International Search Report with written opinion issued in Japanese Patent Application No. PCT/JP2007/055148 dated on Feb. 28, 2008.

"ITU-T Recommendation G.992.1, Series G: Transmission Systems and Media, Digital Systems and Networks, Digital Transmission Systems—Digital Sections and Digital Line System—Access Networks, Asymmetric Digital Subscriber Line (ADSL) Transceivers" International Telecommunication Union, Jul. 1999.

Japanese Notice of Grounds of Rejection, w/ English translation thereof, issued in Japanese Patent Application No. JP 2006-054920 dated Jan. 18, 2011.

* cited by examiner

| LOGIC CHANNEL NUMBER | 1 | 2 | 3 |
|---|---|---|---|
| DATA RATE | 1Mbps | 20Mbps | 10Mbps |
| SNR MARGIN | 10dB | 1dB | 10dB |
| INTERLEAVE DEPTH | 1 | 8 | 4 |

FIG.5

| SUBCARRIER NO. (BEFORE SORTING) | 21 | 6 | ... | 38 | 45 | 9 | 1 | ... | 74 | 43 | 51 | 91 | ... | 19 | 83 | 37 |
|---|---|---|---|---|---|---|---|---|---|---|---|---|---|---|---|---|
| SUBCARRIER NO. (AFTER SORTING) | 1 | 2 | ... | 29 | 30 | 31 | 32 | ... | 39 | 40 | 41 | 42 | ... | 45 | 46 | 47 |
| NUMBER OF BITS | 3 | 3 | ... | 5 | 5 | 3 | 3 | ... | 5 | 6 | 6 | 6 | ... | 6 | 6 | |
| LOGIC CHANNEL NUMBER | 2 | | | | | 1 | | | | 3 | | | | | | |
| SNR MARGIN | 1dB | | | | | 10dB | | | | 10dB | | | | | | |
| DATA RATE | 20Mbps | | | | | 1Mbps | | | | 10Mbps | | | | | | |
| NUMBER OF BITS | 3 | 3 | ... | 5 | 5 | 3 | 3 | ... | 6 | 6 | 6 | 6 | ... | 6 | 6 | |

COMMUNICATION DEVICE, COMMUNICATION SYSTEM, AND COMMUNICATION METHOD PERFORMING COMMUNICATION USING A PLURALITY OF SIGNALS HAVING DIFFERENT FREQUENCIES

BACKGROUND OF THE INVENTION

1. Field of the Invention

The present invention relates to a communication device, a communication system, and a communication method, and more particularly to a communication device, a communication system, and a communication method for performing communication using signals having different frequencies.

2. Description of the Background Art

The xDSL (x Digital Subscriber Line) technique of performing high-speed data communication using an existing telephone line includes, for example, ADSL (Asymmetric DSL), VDSL (Very high-bit-rate DSL) and the like.

The modulation scheme of xDSL includes DMT (Discrete Multi-Tone) modulation scheme in which communication is performed by dividing a transmission frequency bandwidth to be used into narrow bandwidths. For example, in full-rate ADSL (8 Mbps/12 Mbps), the transmission frequency bandwidth of about 1 MHz is divided into 256 subchannels (a bandwidth of 4 kHz).

In the multi-carrier communication system using the DMT modulation scheme, training is carried out to check the state of a line between mutually connected communication devices before data communication is started. In this training, a signal-to-noise ratio (also referred to as SNR hereinafter) is observed for each divided subchannel, and the allocation of the number of bits to be allocated to a subcarrier that is a carrier wave of the subchannel is set according to the observation result. Thus, the communication speed according to the line state is automatically set (best effort method). After completion of the training, a link (connection) between the communication devices is established, and data communication is then started at the set communication speed. Usually, a dynamic change of the communication speed is not made during data communication.

Furthermore, in xDSL device, the number of bits is allocated to each subcarrier such that a communication signal satisfies prescribed reception quality under the condition of SNR obtained by subtracting a prescribed margin value (also referred to as SNR margin hereinafter) from the measured SNR. In other words, the SNR margin is a margin value to prevent a transmission error. Here, SNR differs for each subchannel, and the subchannel having a lower frequency has a larger SNR under the normal use conditions of xDSL. The immunity of a communication channel against a transmission error can be adjusted by setting the SNR margin.

In addition, in xDSL device, an interleaving process of transmitting transmission data in such a manner as to be dispersed in the direction of time-axis is employed in order to reduce the effect of a burst error in transmission. In xDSL device, an encoding process using a combination of this interleaving process with FEC (Forward Error Correction) and CRC (Cyclic Redundancy Check) is performed. Here, a parameter of the interleaving process includes an interleave depth which determines the degree of dispersion of transmission data in the time-axis. The immunity of a communication signal against a burst error can be adjusted by setting this interleave depth. In other words, the immunity of a communication signal against a burst error is improved with the increase in interleave depth. On the other hand, the degree of dispersion of transmission data in the time axis is increased, so that the time until which final data in a transmission data set arrives at the receiver side increases, thereby increasing the transmission delay time. It is noted that that an interleave depth sets at 1 means that an interleaving process is not performed.

Here, since a general telephone line is housed in a telephone cable having lines bundled, crosstalk is caused by electromagnetic coupling between two telephone lines proximate to each other. In view of QOS (Quality of Service), in downloading data via HTTP (Hyper Text Transfer Protocol) and FTP (File Transfer Protocol), a relatively small transmission speed is acceptable, and data resending is also permissible in the event of a transmission error. However, in recent years, demands for IP telephones, TV phones, match games, video distribution using real-time transmission have been increasing. For example, in video streaming distribution, bulk data is transmitted and the communication has to be stabilized with a reduced error rate without interruption of distribution. In addition, in voice data, the transmission delay time has to be reduced.

Here, G.992.1 recommended by International Telecommunication Union, Telecommunication Standardization Sector (ITU-T) (see "Asymmetric Digital Subscriber Line (ADSL) transceiver," ITU-T Recommendations G.992.1 (referred to as Non-Patent Document 1 hereinafter)) defines that two logical data paths (also referred to as logic channels hereinafter) having different interleave depths can be used for one physical transmission path between two communication devices performing ADSL communication. In such xDSL devices, the immunity of a communication signal against a transmission error can be adjusted by setting an interleave depth.

Now, the error rate is decreased with the increased SNR margin. However, the transmission speed is decreased since the number of bits allocated to a subcarrier is reduced.

Here, in the communication device described in Non-Patent Document 1, the same SNR margin has to be set for all the subcarriers. Therefore, it is necessary to set the SNR margin for subcarriers at a larger value in accordance with the logic channel requiring the smaller error rate. Thus, the transmission speed of the other logic channel becomes smaller than necessary. Therefore, the communication device disclosed in Non-Patent Document 1 is unable to transmit data appropriately in accordance with a data type, a purpose and the like.

SUMMARY OF THE INVENTION

An object of the present invention is to provide a communication device, and a communication system, and a communication method to allow data transmission to be performed appropriately in accordance with a data type, a purpose and the like.

A communication device in accordance with an aspect of the present invention includes: a reception unit receiving communication signals having different frequencies, where the communication signals include logic channels, from another communication device; a measurement unit measuring line states of the received communication signals; a communication signal allocation unit allocating one or more of the communication signals to each of the logic channels; a margin setting unit setting a margin value for each of the logic channels and deciding the margin value set for the logic channel corresponding to the communication signal as a margin value of the communication signal; a communication speed decision unit deciding a communication speed of each of the communication signals such that an error rate of each of the communication signals is less than a prescribed value in line states degraded by the margin value of the communication signal from the measured line states; and a transmission unit notifying the other communication device of an allocation result of the communication signal and the decided communication speed.

A communication device in accordance with another aspect of the present invention includes: a transmission unit transmitting communication signals having different frequencies, where the communication signals include logic channels, to another communication device; a reception unit obtaining line states of the communication signals measured by the other communication device from the other communication device; a communication signal allocation unit allocating one or more of the communication signals to each of the logic channels; a margin setting unit setting a margin value for each of the logic channels and deciding the margin value set for the logic channel corresponding to the communication signal as a margin value of the communication signal; and a communication speed decision unit deciding a communication speed of each of the communication signals such that an error rate of each of the communication signals received by the other communication device is less than a prescribed value in line states degraded by the margin value of the communication signal from the obtained line states. The transmission unit transmits the communication signals to the other communication device at the decided communication speed.

Preferably, the communication signal allocation unit allocates one or more of the communication signals to each of the logic channels based on the measured line states and the set margin value of the logic channels.

Preferably, the measurement unit measures a signal-to-noise ratio of the received communication signals, and the communication signal allocation unit sorts the communication signals in increasing order of the signal-to-noise ratio and allocates the sorted communication signals to the logic channels in increasing order of the margin value.

A communication system in accordance with an aspect of the present invention includes a first communication device and a second communication device. The first communication device includes a transmission unit transmitting communication signals having different frequencies to the second communication device. The second communication device includes a reception unit receiving the communication signals from the first communication device, a measurement unit measuring line states of the received communication signals, a communication signal allocation unit allocating one or more of the communication signals to each of the logic channels, a margin setting unit setting a margin value for each of the logic channels and deciding the margin value set for the logic channel corresponding to the communication signal as a margin value of the communication signal, a communication speed decision unit deciding a communication speed of each of the communication signals such that an error rate of each of the communication signals is less than a prescribed value in line states degraded by the margin value of the communication signal from the measured line states, and a transmission unit notifying the first communication device of an allocation result of the communication signal and the decided communication speed. The transmission unit in the first communication device transmits the communication signals to the second communication device at the communication speed as notified.

In accordance with an aspect of the present invention, a communication method in a communication system including a first communication device and a second communication device includes: a step of the first communication device transmitting communication signals having different frequencies to the second communication device; a step of the second communication device measuring line states of communication signals received from the first communication device; a step of the second communication device allocating one or more of the communication signals to each of the logic channels and setting a margin value for each of the logic channels to decide the margin value set for the logic channel corresponding to the communication signal as a margin value of the communication signal; a step of the second communication device deciding a communication speed of each of the communication signals such that an error rate of each of the communication signals is less than a prescribed value in line states degraded by the margin value of the communication signal from the measured line states; a step of the second communication device notifying the first communication device of an allocation result of the communication signal and the decided communication speed; and a transmission step of the first communication device transmitting the communication signals to the second communication device at the communication speed as notified.

Preferably, in the transmission step, the first communication device sets the presence or absence of an interleaving process and an interleave depth for each of the logic channels, performs an interleaving process for the logic channels based on the setting, and transmits communication signals having different frequencies, where the communication signals include logic channels, subjected to the interleaving process to the second communication device at the communication speed as notified.

In accordance with the present invention, data transmission can be performed appropriately in accordance with a data type, a purpose and the like.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described with reference to the figures. It is noted that in the figures the same or corresponding parts will be denoted with the same reference characters and thus the description will not be repeated.

[Configuration and Basic Operation]

Figure 1:
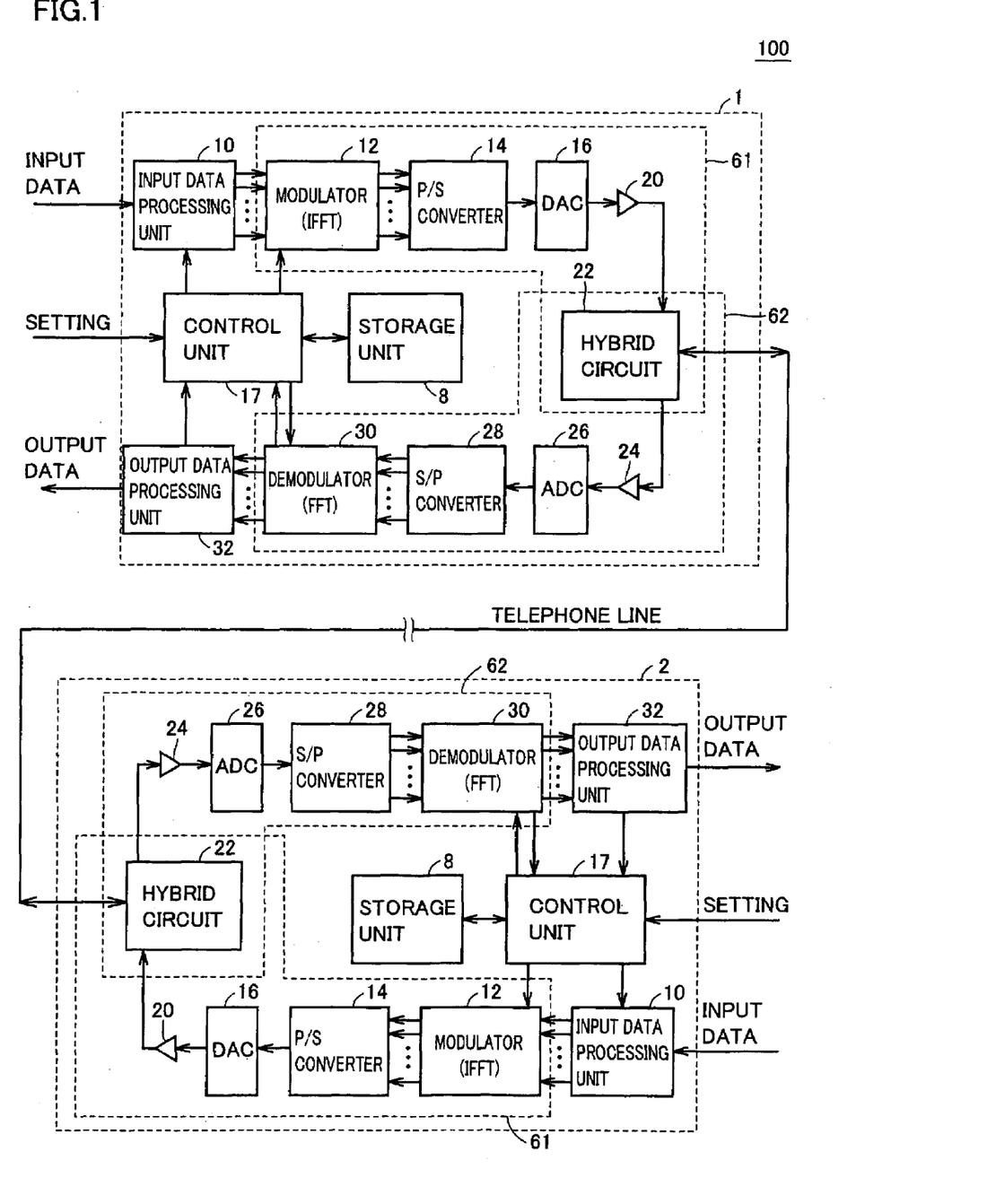
FIG. 1 is a functional block diagram showing a configuration of a communication system and a communication device in the communication system in accordance with an embodiment of the present invention.

FIG. 1 is a functional block diagram showing a configuration of a communication system and a communication device in the communication system in accordance with an embodiment of the present invention.

Referring to FIG. 1, a communication system 100 includes a station-side device 1 which is a communication device and a terminal-side device 2 which is also a communication device. Station-side device 1 and terminal-side device 2 are connected to each other via a telephone line. Station-side device 1 transmits communication signals corresponding to subcarriers to terminal-side device 2 as the other party. On the other hand, terminal-side device 2 transmits communication signals corresponding to subcarriers to station-side device 1 as the other party. It is noted that the communication system may be configured to include station-side devices 1 and terminal-side devices 2 or may be configured such that one station-side device 1 communicates with terminal-side devices 2. For example, station-side device 1 may include communication devices and each of the communication devices may perform one-to-one communicate with terminal-side devices 2. At least one station-side device 1 may have a function as an administration device which monitors and controls other station-side devices 1 and terminal-side devices 2 in this communication system.

Station-side device 1 includes a transmission unit 61, a reception unit 62, a storage unit 8, a control unit 17, an input data processing unit 10, and an output data processing unit 32. Transmission unit 61 includes a modulator (IFFT) 12, a parallel/serial (P/S) converter 14, a digital-to-analog converter (DAC) 16, a driver unit 20, and a hybrid circuit 22. Reception unit 62 includes hybrid circuit 22, a low-noise amplifier 24, an analog-to-digital converter (ADC) 26, a serial/parallel (S/P) converter 28, and a demodulator (FFT) 30.

Input data processing unit 10 performs a variety of signal processing as described later for input data to be transmitted to terminal-side device 2 as the other party and allocates the input data subjected to the signal processing to subcarriers. Then, input data processing unit 10 outputs data for each subcarrier to modulator 12.

Modulator 12 digitally modulates the data for each subcarrier received from input data processing unit 10 by Inverse Fast Fourier Transform (IFFT). Then, modulator 12 outputs the digitally modulated signal to parallel/serial converter 14.

Parallel/serial converter 14 converts the parallel signal received from modulator 12 into a serial signal for output to digital-to-analog converter 16.

Digital-to-analog converter 16 converts the digital signal received from parallel/serial converter 14 into an analog signal for output to driver unit 20.

Driver unit 20 amplifies the analog signal received from digital-to-analog converter 16 to a prescribed level for output to hybrid circuit 22.

Hybrid circuit 22 transmits the analog signal received from driver unit 20 as a communication signal to terminal-side device 2 through a telephone line. Hybrid circuit 22 also outputs the analog signal, which is a communication signal received from terminal-side device 2 through a telephone line, to low-noise amplifier 24.

Low-noise amplifier 24 adjusts the analog signal received from hybrid circuit 22 to a prescribed level and thereafter outputs the adjusted analog signal to analog-to-digital converter 26.

Analog-to-digital converter 26 converts the analog signal received from low-noise amplifier 24 to a digital signal for output to serial/parallel converter 28.

Serial/parallel converter 28 converts the serial signal received from analog-to-digital converter 26 into a parallel signal for output to demodulator 30.

Demodulator 30 digitally demodulates the data received from serial/parallel converter 28 by Fast Fourier Transform (FFT). Then, demodulator 30 outputs the digitally demodulated data for each subcarrier to output data processing unit 32.

Output data processing unit 32 reconstructs original data from the data for each subcarrier received from demodulator 30 and outputs the same to the outside. Output data processing unit 32 also outputs a part or all of the reconstructed data to control unit 17 as reception data information.

Control unit 17 controls each block in the communication device, such as input data processing unit 10, modulator (IFFT) 12, demodulator (FFT) 30 and output data processing unit 32.

Figure 2:
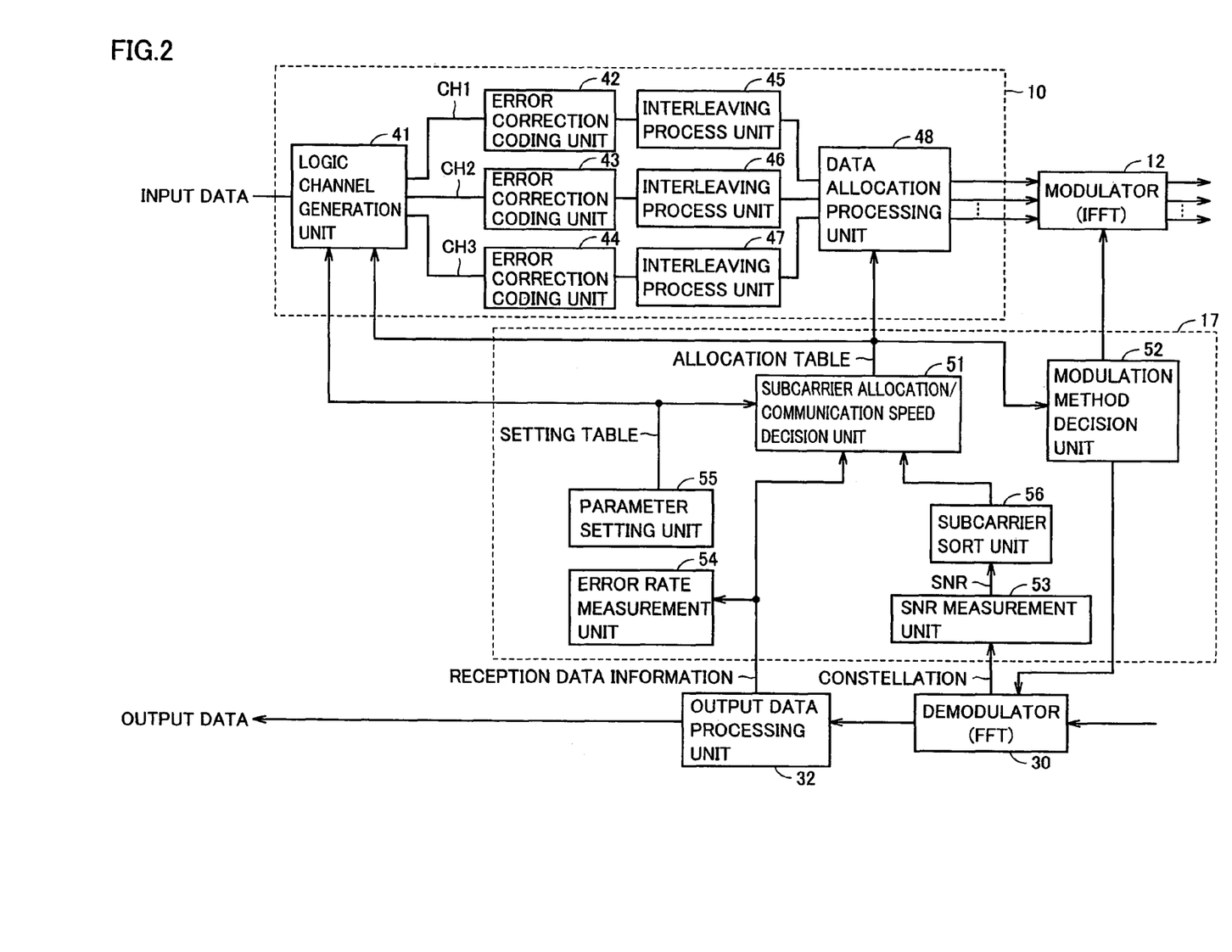
FIG. 2 is a functional block diagram showing a configuration of an input data processing unit and a control unit.

FIG. 2 is a functional block diagram showing the configuration of the input data processing unit and the control unit.

Referring to FIG. 2, input data processing unit 10 includes a logic channel generation unit (data input unit) 41, error correction coding units 42-44, interleaving process units 45-47, and a data allocation processing unit 48. Control unit 17 includes a subcarrier allocation (communication signal allocation)/communication speed decision unit 51, a modulation method decision unit 52, an SNR measurement unit 53, an error rate measurement unit 54, a parameter setting unit (margin setting unit) 55, and a subcarrier sort unit 56.

Logic channel generation unit 41 receives externally input data and generates data of channels CH1-CH3 from the input data for output to error correction coding units 42-44.

Error correction coding units 42-44 perform, for example, a CRC process and an FEC process for the data of logic channels CH1-CH3 received from logic channel generation unit 41, for output to interleaving process units 45-47.

Interleaving process units 45-47 perform an interleaving process for the data of logic channels CH1-CH3 received from error correction coding units 42-44, based on the interleave depth set for each logic channel by parameter setting unit 55, for output to data allocation processing unit 48.

Data allocation processing unit 48 rearranges the data of logic channels CH1-CH3 received from interleaving process units 45-47, based on the correspondence between logic channels and subcarriers represented by an allocation table described later, for output to modulator 12.

It is noted that the operation of each block in control unit 17 will be described later. Furthermore, the configuration and basic operation of terminal-side device 2 is similar to those of station-side device 1 and therefore the detailed description will not be repeated here.

Next, description will be made to the operation where the communication device in accordance with the embodiment of the present invention decides a communication signal to be allocated to a logic channel and the communication speed of a communication signal.

[Operation]

Figure 3:
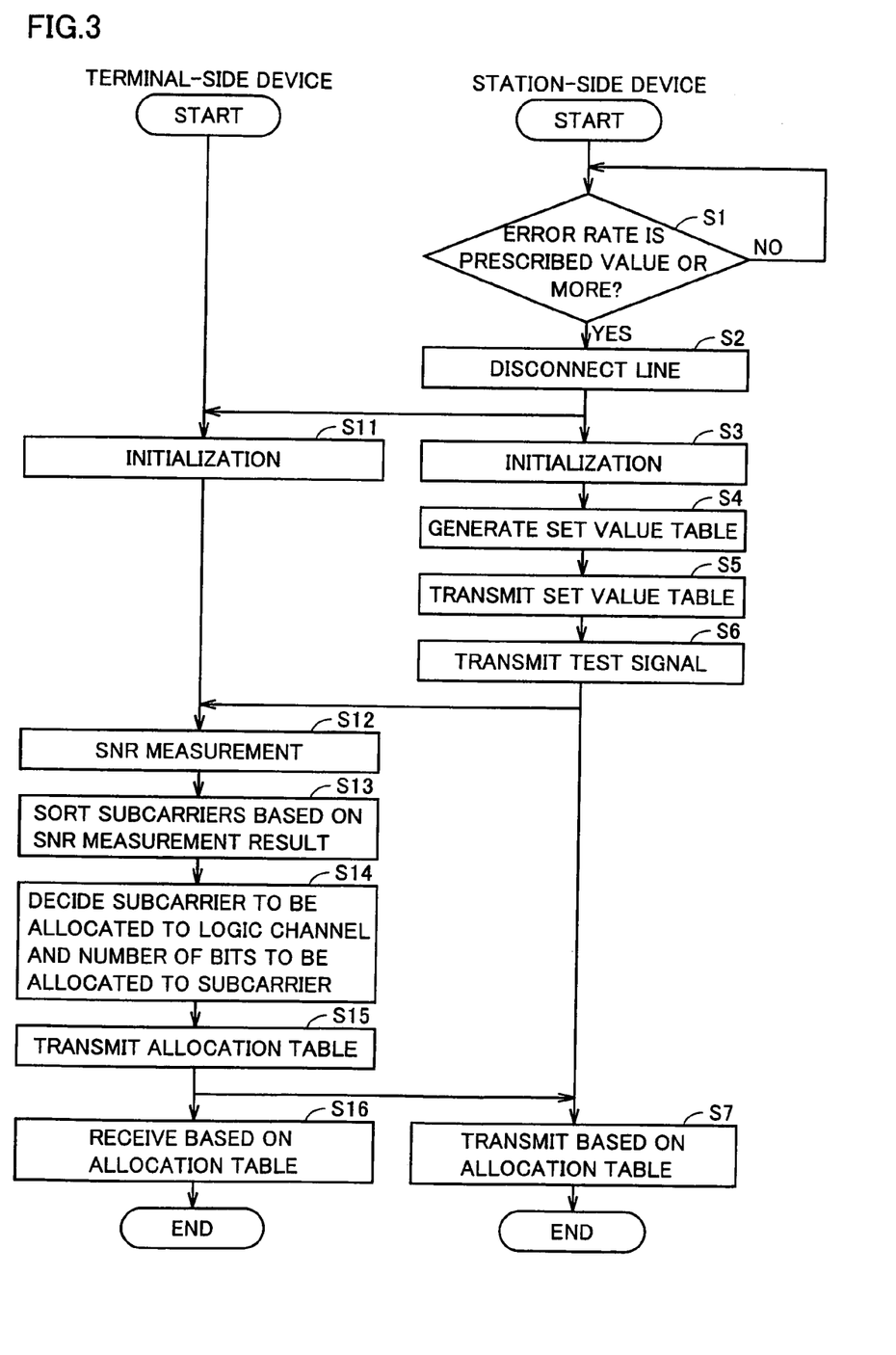
FIG. 3 is a flowchart defining an operation procedure when the communication device in accordance with the embodiment of the present invention generates an allocation table for the down-link direction.

FIG. 3 is a flowchart defining an operation procedure when the communication device in accordance with the embodiment of the present invention generates an allocation table for the down-link direction.

In the state where station-side device 1 and terminal-side device 2 are performing communication, station-side device 1 monitors the reception quality of the communication signal between station-side device 1 and terminal-side device 2.

More specifically, in station-side device 1, error rate measurement unit 54 in control unit 17 calculates the error rate of the communication signal in the communication direction from terminal-side device 2 to station-side device 1 (also referred to as the up-link direction hereinafter) based on reception data information received from output data processing unit 32.

On the other hand, in terminal-side device 2, error rate measurement unit 54 in control unit 17 calculates the error rate of the communication signal in the communication direction from station-side device 1 to terminal-side device 2 (also referred to as the down-link direction) based on reception data information received from output data processing unit 32. Then, control unit 17 in terminal-side device 2 controls input data processing unit 10 and the like to incorporate the result of the error rate calculation into a communication signal for transmission to station-side device 1. Then, in station-side device 1, error-rate measurement unit 54 extracts the error rate of the communication signal in the down-link direction from the reception data information received from output data processing unit 32.

If the error rate of the communication signal in the down-link direction or the error rate of the communication signal in the up-link direction is a prescribed value or more (YES at S1), station-side device 1 performs control to disconnect the up-link and down-link lines (S2).

Then, training is started in the communication system in accordance with the embodiment of the present invention. More specifically, when the up-link and down-link lines are disconnected, station-side device 1 and terminal-side device 2 execute initialization (S3 and S11). For example, control units 17 in station-side device 1 and terminal-side device 2 perform gain setting or the like for AGC (Auto Gain Control) circuits included in respective driver units 20 and low-noise amplifiers 24 by controlling modulator 12, demodulator 30 and the like to transmit/receive an unmodulated signal. It is noted that station-side device 1 and terminal-side device 2 may be configured to execute initialization when station-side device 1 or terminal-side device 2 is powered on or when the user inputs an initialization command to station-side device 1 or terminal-side device 2.

Upon completion of the initialization, station-side device 1 generates a set value table for each of the up-link direction and the down-link direction (S4). More specifically, parameter setting unit 55 in station-side device 1 sets an SNR margin, a data rate and an interleave depth for each logic channel. For example, storage unit 8 stores a set value table in which an SNR margin, a data rate and an interleave depth are defined for each logic channel. Parameter setting unit 55 selects any one of set value tables and sets an SNR margin, a data rate and an interleave depth for each logic channel.

Figure 4:
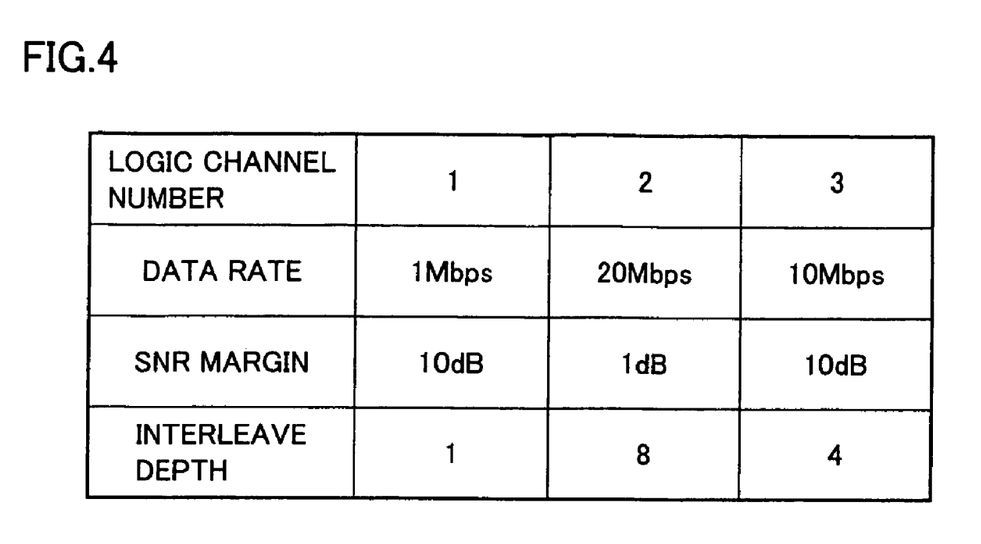
FIG. 4 is a diagram showing an exemplary set value table in the communication device in accordance with the embodiment of the present invention.

FIG. 4 is a diagram showing an exemplary set value table in the communication device in accordance with the embodiment of the present invention.

Referring to FIG. 4, for example, logic channel CH1 corresponds to VoIP (Voice over Internet Protocol) that is voice data. Logic channel CH2 corresponds to video data subjected to streaming distribution. Logic channel CH3 corresponds to normal video data.

The set value table is a table representing the correspondence between logic channels and parameters, which are a data rate, an SNR margin and an interleave depth, for use in the communication between station-side device 1 and terminal-side device 2. The set value table for the up-link direction represents the correspondence between a logic channel and each parameter for use in communication in the up-link direction, and the set value table for the down-link direction represents the correspondence between a logic channel and each parameter for use in communication in the down-link direction.

Parameter setting unit 55 sets the data rate of logic channel CH1 at 1 Mbps, sets the SNR margin at 10 dB and sets the interleave depth at 1. Parameter setting unit 55 sets the data rate of logic channel CH2 at 20 Mbps, sets the SNR margin at 1 dB and sets the interleave depth at 8. Parameter setting unit 55 sets the data rate of logic channel CH3 at 10 Mbps, sets the SNR margin at 10 dB and sets the interleave depth at 4.

In this manner, for logic channel CH1 corresponding to VoIP that is voice data, the interleave depth is set at 1 in order to shorten the transmission delay time. On the other hand, since the immunity against a burst error is reduced, the SNR margin is set at relatively high 10 dB in order to enhance the immunity against a transmission error. For logic channel CH2 corresponding to video data subjected to streaming distribution, the SNR margin is set at relatively low 1 dB to increase the transmission speed, and on the other hand, the interleave depth is set at 8 to enhance the immunity against a burst error.

Referring to FIG. 3 again, station-side device 1 transmits the generated set value table for the down-link direction to terminal-side device 2. More specifically, parameter setting unit 55 of control unit 17 in station-side device 1 outputs the generated set value table for the down-link direction to input data processing unit 10. The set value table for the down-link direction allows signal processing such as error correction coding and allocation to a subcarrier to be performed in input data processing unit 10 and is transmitted to terminal-side device 2 through modulator 12, P/S converter 14, digital-to-analog converter 16, driver unit 20, and hybrid circuit 22 (S5).

In addition, station-side device 1 transmits, for example, PN (Pseudo Noise) sequence signal (also referred to as a test signal hereinafter) as a communication signal to terminal-side device 2. Similarly to the set value table, the test signal is transmitted to terminal-side device 2 through modulator 12, P/S converter 14, digital-to-analog converter 16, driver unit 20, and hybrid circuit 22 (S6).

Terminal-side device 2 measures the SNR of the test signal received from station-side device 1. More specifically, in terminal-side device 2, demodulator 30 receives from serial/parallel converter 28 and digitally demodulates the data corresponding to the test signal and outputs constellation to control unit 17. SNR measurement unit 53 in control unit 17 measures the signal-to-noise ratio of the test signal based on the constellation received from demodulator 30 (S12). Here, constellation means the symbol arrangement in IQ coordinate plane formed of in-phase (I phase) component and quadrature (Q phase) component of the modulated signal.

Terminal-side device 2 decides one or more subcarriers to be allocated to each of logic channels based on the SNR measurement result of the test signal and the set value table for the down-link direction received from station-side device 1 and also decides the communication speed of each of communication signals transmitted from station-side device 1. For example, terminal-side device 2 generates an allocation table for the down-link direction which represents the correspondence between logic channels used by station-side device 1 to transmit communication signals, subcarriers and the number of bits allocated to each subcarrier and transmits the generated table to station-side device 1 (S13-S15).

More specifically, subcarrier sort unit 56 in terminal-side device 2 sorts subcarriers, for example, in increasing order of SNR based on the SNR measurement result of the test signal and outputs the sort result to subcarrier allocation/communication speed decision unit 51 (S13). Subcarrier sort unit 56 also outputs the SNR measurement result of the test signal to subcarrier allocation/communication speed decision unit 51.

Subcarrier allocation/communication speed decision unit 51 extracts the set value table for the down-link direction transmitted by station-side device 1 from the reception data information received from output data processing unit 32. Then, subcarrier allocation/communication speed decision unit 51 decides a subcarrier to be allocated to each of logic channels, based on the sort result received from subcarrier sort unit 56, the SNR measurement result of the test signal, and the SNR margin and data rate for each logic channel represented by the extracted set value table for the down-link direction, and decides the number of bits to be allocated to each subcarrier, that is, the communication speed for each communication signal. Subcarrier allocation/communication speed decision unit 51 generates an allocation table for the down-link direction, which represents a subcarrier allocated to each of logic channels and the number of bits allocated to each subcarrier, and outputs the generated allocation table to logic channel generation unit 41 and modulation method decision unit 52 (S14).

The allocation table for the down-link direction is transmitted to station-side device 1 through input data processing unit 10, modulator 12, P/S converter 14, digital-to-analog converter 16, driver unit 20, and hybrid circuit 22 (S15).

Figure 5:
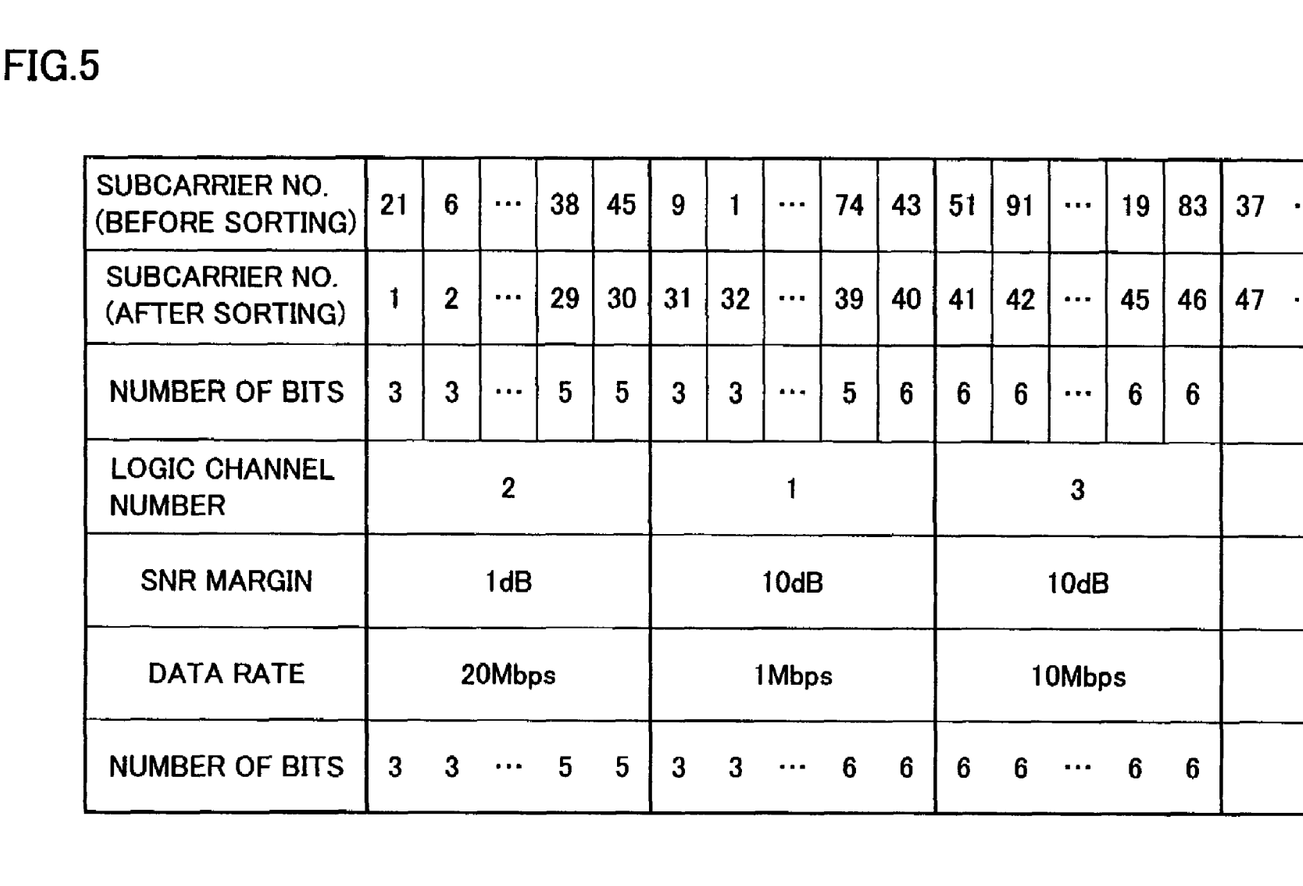
FIG. 5 is a diagram showing an exemplary allocation table in the communication device in accordance with the embodiment of the present invention.
Figure 6:
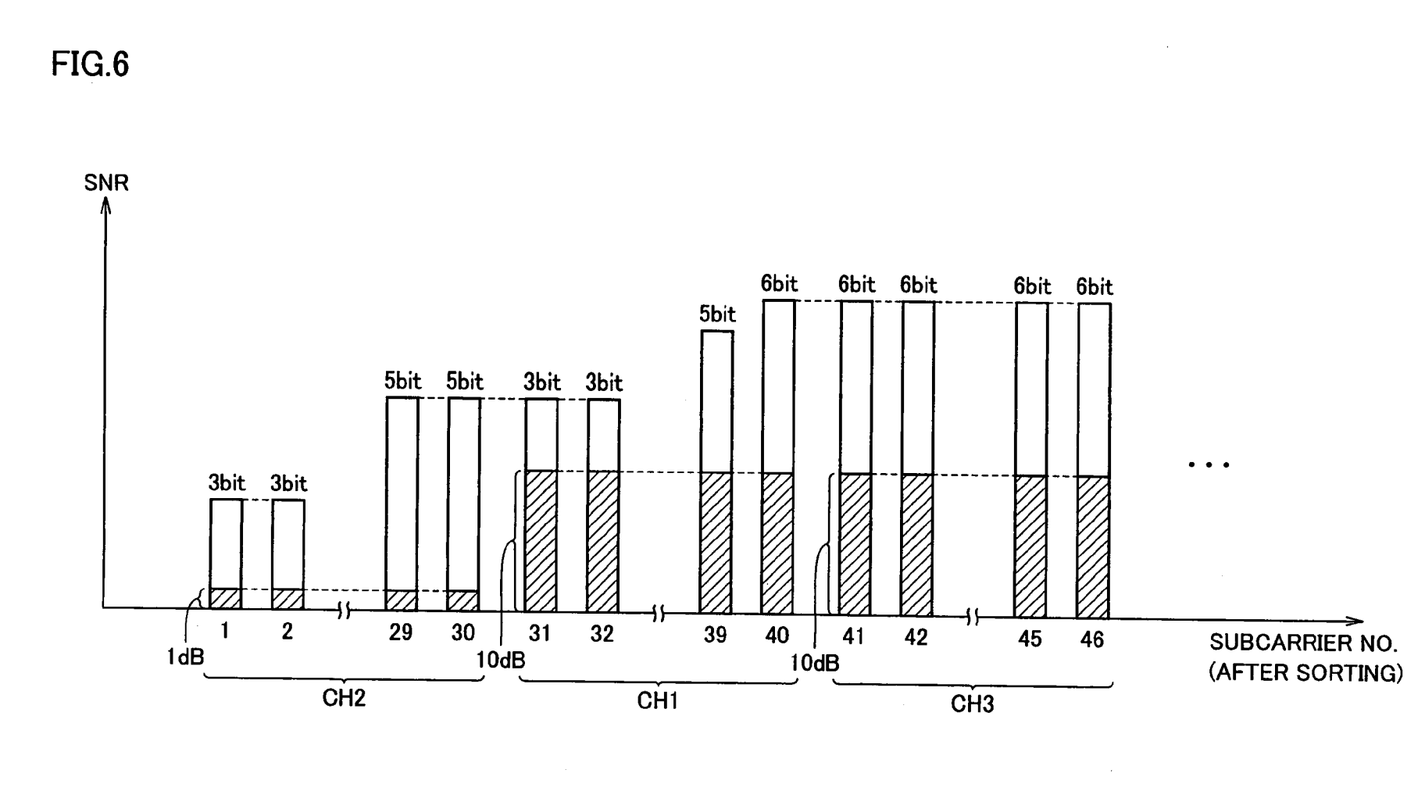
FIG. 6 is a graph schematically showing an operation of the communication device in accordance with the embodiment of the present invention generating an allocation table.

FIG. 5 is a diagram showing an exemplary allocation table in the communication device in accordance with the embodiment of the present invention. FIG. 6 is a graph schematically showing an operation of the communication device in accordance with the embodiment of the present invention generating an allocation table. It is noted that although the allocation table shown in FIG. 5 includes SNR margin and data rate for each logic channel in order to facilitate understanding, they may not be included in the allocation table. Furthermore, for the sake of brevity, a subcarrier number refers to a number provided after subcarrier sort unit 56 performs sorting, unless otherwise specified.

Referring to FIGS. 5 and 6, subcarriers are arranged in increasing order of SNR, starting from number one.

Subcarrier allocation/communication speed decision unit 51 allocates the subcarriers sorted in increasing order of SNR to logic channels in order of increasing SNR margins. It is noted that subcarrier allocation/communication speed decision unit 51 sorts subcarriers with the same SNR in increasing order of frequency. Subcarrier allocation/communication speed decision unit 51 allocates as many subcarriers as required to realize the data rate of a logic channel to the logic channel.

More specifically, first, subcarrier allocation/communication speed decision unit 51 decides the order of logic channels to which sorted subcarriers are allocated. For example, subcarrier allocation/communication speed decision unit 51 puts logic channel CH2 having the smallest SNR margin of 1 dB in the first place, of logic channels CH1-CH3. Then, subcarrier allocation/communication speed decision unit 51 puts logic channel CH1 having the smaller interleave depth in the second place, of logic channels CH1 and CH3 having the same SNR margin of 10 dB, and then puts logic channel CH3 in the third place.

Next, subcarrier allocation/communication speed decision unit 51 decides the subcarrier to be allocated to logic channel CH2 and the communication speed of the communication signal corresponding to the subcarrier allocated to logic channel CH2, based on the SNR margin of logic channel CH2 to which the sorted subcarrier is allocated in the first place.

Subcarrier allocation/communication speed decision unit 51 decides, as the communication speed of the communication signal from the other party, the communication speed lower than the communication speed at which a communication signal can satisfy prescribed reception quality under the condition of the SNR measurement result of the test signal, that is, the SNR of the communication signal measured by SNR measurement unit 53. In other words, subcarrier allocation/communication speed decision unit 51 decides, as the communication speed of the communication signal from the other party, the communication speed at which the error rate of the communication signal is less than a prescribed value under the condition of the SNR degraded by the SNR margin from the measured SNR of the communication signal.

Specifically, for example if the SNR of the communication signal in subcarrier 1 is 10 dB, subcarrier allocation/communication speed decision unit 51 determines that three bits can be allocated to subcarrier 1, where the error rate of the communication signal in subcarrier 1 is less than $10^{-7}$ under the condition of the SNR of 9 dB degraded by 1 dB of the SNR margin of logic channel CH2 from 10 dB.

Then, subcarrier allocation/communication speed decision unit 51 allocates subcarrier 1-subcarrier 30 required to secure the data rate 20 Mbps to logic channel CH2, based on the number of bits that can be allocated to each subcarrier as calculated in this manner. In addition, subcarrier allocation/communication speed decision unit 51 assumes the number of allocated bits of subcarrier 1-subcarrier 30 allocated to logic channel CH2 as the number of bits calculated based on the SNR margin of logic channel CH2.

Next, subcarrier allocation/communication speed decision unit 51 decides a subcarrier to be allocated to logic channel CH1, of unallocated subcarriers, and the communication speed of the communication signal corresponding to the subcarrier allocated to logic channel CH1, based on the SNR margin of logic channel CH1 to which the sorted subcarrier is allocated in the second place.

Specifically, if the SNR of the communication signal in subcarrier 31 is 19 dB, subcarrier allocation/communication speed decision unit 51 determines that three bits can be allocated to subcarrier 31, where the error rate of the communication signal in subcarrier 31 is less than $10^{-7}$ under the condition of the SNR of 9 dB which is degraded by 10 dB of the SNR margin of logic channel CH2 from 19 dB.

Then, subcarrier allocation/communication speed decision unit 51 allocates subcarrier 31-subcarrier 40 required to secure the data rate 1 Mbps to logic channel CH1, based on the number of bits that can be allocated to each subcarrier as calculated in this manner. In addition, subcarrier allocation/communication speed decision unit 51 assumes the number of bits allocated to subcarrier 31-subcarrier 40 allocated to logic channel CH1 as the number of bits calculated based on the SNR margin of logic channel CH1.

Next, subcarrier allocation/communication speed decision unit 51 decides a subcarrier to be allocated to logic channel CH3, of unallocated subcarriers, and the communication speed of the communication signal corresponding to the subcarrier allocated to logic channel CH3, based on the SNR margin of logic channel CH3 to which the sorted subcarrier is allocated in the third place.

Specifically, for example if the SNR of the communication signal in subcarrier 41 is 22 dB, subcarrier allocation/communication speed decision unit 51 determines that six bits can be allocated to subcarrier 41, where the error rate of the communication signal in subcarrier 41 is less than $10^{-7}$ under the condition of the SNR of 12 dB degraded by 10 dB of the SNR margin of logic channel CH3 from 22 dB.

Then, subcarrier allocation/communication speed decision unit 51 allocates subcarrier 41-subcarrier 46 required to secure the data rate 10 Mbps to logic channel CH3, based on the calculated number of bits that can be allocated to each subcarrier. In addition, subcarrier allocation/communication speed decision unit 51 assumes the number of bits allocated to subcarrier 41-subcarrier 46 allocated to logic channel CH3 as the number of bits calculated based on the SNR margin of logic channel CH3.

Referring to FIG. 3 again, station-side device 1 decides, for example, the modulation method of each of communication signals based on the communication speed of communication signals corresponding to subcarriers as represented by the allocation table for the down-link direction received from terminal-side device 2. More specifically, modulation method decision unit 52 of control unit 17 in station-side device 1 extracts the allocation table for the down-link direction transmitted by terminal-side device 2, from the reception data information received from output data processing unit 32. Then, modulation method decision unit 52 decides the modulation method of each of communication signals corresponding to subcarriers based on the extracted allocation table for the down-link direction and notifies modulator 12 of the decided modulation method. Modulator 12 modulates data of each subcarrier in the modulation method indicated by the notification from control unit 17 (S7).

Modulation method decision unit 52 in terminal-side device 2 recognizes the modulation method of the communication signal transmitted from station-side device 1 based on the allocation table for the down-link direction received from subcarrier allocation/communication speed decision unit 51 and notifies demodulator 30 of the modulation method. Demodulator 30 demodulates the communication signal of each subcarrier in the modulation method indicated by the notification from control unit 17 (S16).

More specifically, for example, since the number of bits allocated to subcarrier 1 is three, modulation method decision unit 52 decides on 8-PSK (Phase Shift Keying) having a small symbol rate corresponding to three as the modulation method for the communication signal of subcarrier 1. Furthermore, since the number of bits allocated to subcarrier 41 is six, modulation method decision unit 52 decides on 64 QAM (Quadrature Amplitude Modulation) having a large symbol rate corresponding to six bits as a modulation method for the communication signal of subcarrier 41.

Figure 7:
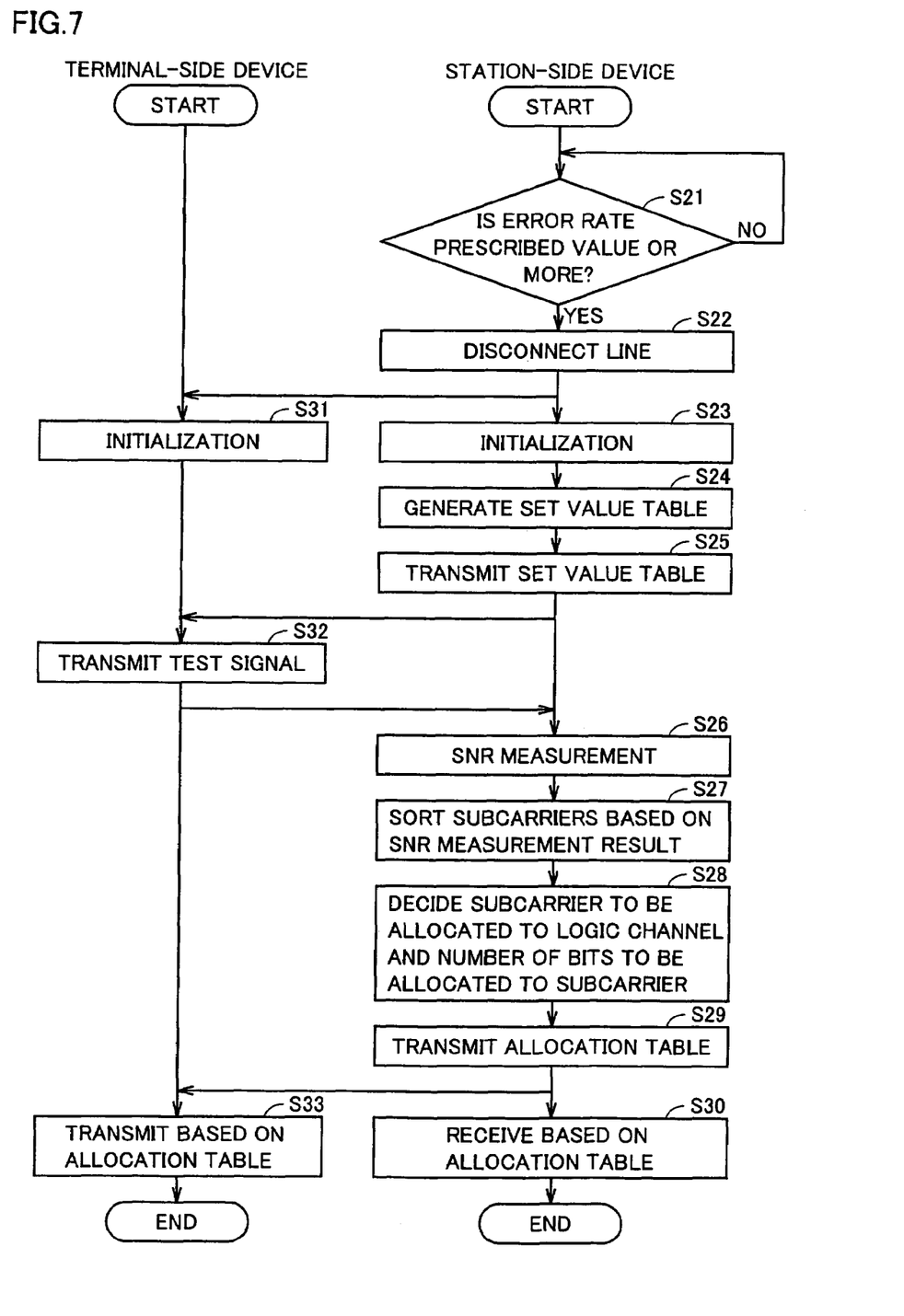
FIG. 7 is a flowchart defining an operation procedure when the communication device in accordance with the embodiment of the present invention generates an allocation table for the up-link direction.

FIG. 7 is a flowchart defining an operation procedure when the communication device in accordance with the embodiment of the present invention generates the allocation table for the up-link direction.

Referring to FIG. 7, step S21-step S24 and step S31 are similar to step S1-step S4 and step S11 in the flowchart shown in FIG. 3.

Station-side device 1 transmits the generated set value table for the up-link direction to terminal-side device 2 (S25). Parameter setting unit 55 of control unit 17 in station-side device 1 outputs the generated set value table for the up-link direction to subcarrier allocation/communication speed decision unit 51.

Furthermore, terminal-side device 2 transmits a test signal to station-side device 1 (S32).

Station-side device 1 measures the SNR of the test signal received from terminal-side device 2 (S26).

Station-side device 1 decides one or more subcarriers to be allocated to each of logic channels and also decides the communication speed of each of communication signals transmitted from terminal-side device 2, based on the SNR measurement result of the test signal and the set value table for the up-link direction generated by itself. For example, station-side device 1 generates an allocation table for the up-link direction, which represents the correspondence between logic channels used by terminal-side device 2 to transmit communication signals, subcarriers and the number of bits allocated to each subcarrier, and transmits the generated allocation table to terminal-side device 2 (S27-S29).

Terminal-side device 2 decides, for example, the modulation method of each of communication signals based on the communication speed of communication signals corresponding to subcarriers as represented by the allocation table for the up-link direction received from station-side device 1. Terminal-side device 2 modulates data of each subcarrier in the modulation method indicated by the notification from control unit 17 (S33).

Modulation method decision unit 52 in station-side device 1 recognizes the modulation method for the communication signal transmitted from terminal-side device 2 based on the allocation table for the up-link direction received from subcarrier allocation/communication speed decision unit 51 and notifies demodulator 30 of the modulation method. Demodulator 30 demodulates the communication signal of each subcarrier in the modulation method indicated by the notification from control unit 17 (S30).

Now, in the communication device described in Non-Patent Document 1, the same SNR margin has to be set for all the subcarriers, and therefore data transmission cannot be performed appropriately in accordance with a data type, a purpose and the like. However, in the communication device in accordance with the embodiment of the present invention, parameter setting unit 55 sets the SNR margin for each logic channel. Then, subcarrier allocation/communication speed decision unit 51 decides, as the communication speed of the communication signal from the other party, the communication speed at which the error rate of the communication signal is less than a prescribed value under the condition of the SNR degraded by the SNR margin from the measured SNR of the communication signal.

Therefore, in the communication device in accordance with the embodiment of the present invention, the SNR margin can be set in accordance with a data type, a purpose and the like corresponding to a logic channel, and data transmission can be performed appropriately.

[Modification]

The present invention is not limited to the foregoing embodiment and includes, for example, the following modifications.

(1) Allocation of Subcarrier

In the communication device in accordance with the embodiment of the present invention, subcarrier allocation/communication speed decision unit 51 allocates as many subcarriers as required to secure a data rate of a logic channel to the logic channel, based on the calculated number of bits that can be allocated to each subcarrier. However, the present invention is not limited thereto. For example, if the ratio of subcarriers allocated to each of logic channels CH1-CH3 is predetermined, subcarrier allocation/communication speed decision unit 51 can allocate a subcarrier to a logic channel without using the SNR measurement result of the test signal and SNR margin. Specifically, if the ratio of subcarriers allocated to each of logic channels CH1-CH3 is 1:1:1, subcarrier allocation/communication speed decision unit 51 may allocate subcarrier 1 to logic channel CH1, allocates subcarrier 2 to logic channel CH2, allocates subcarrier 3 to logic channel CH3, and sequentially allocates subcarriers following subcarrier 4 to logic channels CH1-CH3, similarly.

(2) Setting of Logic Channel

Parameter setting unit 55 may use any one of logic channels used in communication between station-side device 1 and terminal-side device 2 as a logic channel having the smallest error rate and the highest immunity against a transmission error. For example, parameter setting unit 55 sets the SNR margin of logic channel CH1 to be the largest and sets the interleave depth to be the largest, among all the logic channels. Then, subcarrier allocation/communication speed decision unit 51 at least allocates the subcarrier having the largest SNR among subcarriers to logic channel CH1.

As described above, if the error rate of a communication signal in the down-link direction or the error rate of a communication signal in the up-link direction is a prescribed value or more (YES at S1), control unit 17 in the communication device in accordance with the embodiment of the present invention disconnects the up-link and down-link lines and performs retraining (S2). However, when of all the logic channels, logic channel CH1 is used as a logic channel having the smallest error rate and the highest immunity against a transmission error in this way, control unit 17 may not perform line disconnection and retraining for the subcarrier allocated to logic channel CH1 and may maintain communication. Because of such a configuration, data transmission which strongly requires stabilization of communication can be performed properly.

(3) Generation and Transmission of Bit Table

In the communication system in accordance with the embodiment of the present invention, when an allocation table for the down-link direction is generated, terminal-side device 2 generates an allocation table for the down-link direction based on the SNR measurement result of the test signal in the down-link direction and the set value table for the down-link direction received from station-side device 1. However, the present invention is not limited thereto. Terminal-side device 2 may transmit the SNR measurement result of the test signal in the down-link direction to station-side device 1. Then, station-side device 1 may generate an allocation table for the down-link direction based on the SNR measurement result of the test signal in the down-link direction and the set value table for the down-link direction and transmit the generated allocation table to terminal-side device 2. Then, terminal-side device 2 may recognize the modulation method of the communication signal transmitted from station-side device 1 based on the allocation table for the down-link direction received from station-side device 1.

On the other hand, when an allocation table for the up-link direction is generated, station-side device 1 may transmit the SNR measurement result of the test signal in the up-link direction and the set value table for the up-link direction to terminal-side device 2. Then, terminal-side device 2 may generate an allocation table for the up-link direction based on the SNR measurement result of the test signal in the up-link direction and transmit the generated allocation table to station-side device 1. Then, station-side device 1 may recognize the modulation method of the communication signal transmitted from terminal-side device 2 based on the allocation table for the down-link direction received from terminal-side device 2.

(4) SNR

In the communication device in accordance with the embodiment of the present invention, subcarrier allocation/communication speed decision unit 51 decides, as the communication speed of the communication signal transmitted by the other party, the communication speed at which the error rate of the communication signal is less than a prescribed value under the condition of the SNR degraded by the SNR margin from the SNR measurement result of the communication signal. However, the present invention is not limited to SNR, and any index that represents the state of line of a communication signal may be used in place of SNR.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication device comprising:
a reception unit configured to receive a first plurality of subcarriers having different frequencies, where a plurality of said first plurality of subcarriers are allocated to each of a plurality of logic channels, from another communication device;
a measurement unit configured to measure line states of said received first plurality of subcarriers;
a communication signal allocation unit configured to allocate a plurality of said first plurality of subcarriers to each of said logic channels;
a margin setting unit configured to set a margin value for each of said logic channels and to set a margin value for each of said first plurality of subcarriers as the margin value set for the logic channel to which it is assigned;
a communication speed decision unit deciding the number of bits allocated to each of said first plurality of subcarriers such that an error rate of said logic channel on the subcarriers is less than a prescribed value in line states degraded by the margin value set for the subcarrier from the line state measured for the subcarrier; and
a transmission unit configured to notify said another communication device by transmitting information regarding which of said logic channels is allocated to each of said first plurality of subcarriers and the decided number of bits allocated to each of said first plurality of subcarriers, wherein said communication signal allocation unit allocates a plurality of said first plurality of subcarriers to each of said logic channels based on said measured line states and said set margin value of said logic channels.

2. The communication device according to claim 1, wherein:
said measurement unit measures signal-to-noise ratio of said received subcarriers, and
said communication signal allocation unit sorts said subcarriers in increasing order of said signal-to-noise ratio and allocates said sorted subcarriers to said logic channels in increasing order of said margin value.

3. A communication device comprising:
a transmission unit configured to transmit a first plurality of subcarriers having different frequencies, where a plurality of said first plurality of subcarriers is allocated to each of a plurality of logic channels, to another communication device;
a reception unit configured to receive information regarding line states of said first plurality of subcarriers measured by said another communication device, from said another communication device;
a communication signal allocation unit configured to allocate a plurality of said first plurality of subcarriers to each of said logic channels;
a margin setting unit configured to set a margin value for each of said logic channels and to set a margin value for each of said first plurality of subcarriers, as the margin value set for the logic channel to which it is assigned; and a communication speed decision unit configured to decide the number of bits allocated to each of said first plurality of subcarriers such that an error rate of said logic channel on the subcarriers received by said another communication device is less than a prescribed value in line states degraded by the margin value set for the subcarrier from the line state obtained for the subcarrier, wherein:

said transmission unit transmits said first plurality of subcarriers to said another communication device, along with information regarding the decided number of bits allocated to each of said first plurality of subcarriers; and said communication signal allocation unit allocates a plurality of said first plurality of subcarriers to each of said logic channels based on said measured line states and said set margin value of said logic channels.

4. The communication device according to claim 3, wherein said information regarding said line states received by said reception unit indicates a received signal-to-noise ratio of said first plurality of subcarriers by said another communication device, and said communication signal allocation unit sorts said subcarriers in increasing order of said signal-to-noise ratio and allocates said sorted subcarriers to said logic channels in increasing order of said margin value.

5. A communication system comprising:

a first communication device, and a second communication device, wherein:

said first communication device includes a transmission unit transmitting a first plurality of subcarriers having different frequencies to said second communication device;

said second communication device comprises:

a reception unit configured to receive said first plurality of subcarriers from said first communication device, a measurement unit configured to measure line states of said received first plurality of subcarriers, a communication signal allocation unit configured to allocate a plurality of said received first plurality of subcarriers to each of a plurality of logic channels, a margin setting unit configured to set a margin value for each of said logic channels and sets a margin value for each of said first plurality of subcarriers as the margin value set for the logic channel to which it is assigned, a communication speed decision unit configured to decide the number of bits allocated to each of said first plurality of subcarriers such that an error rate of said logic channel on the subcarriers is less than a prescribed value in line states degraded by the margin value set for the subcarrier from the line state measured for the subcarrier, and a transmission unit configured to notify said first communication device by transmitting information regarding which of said logic channels each of said first plurality of subcarriers is allocated to and the decided number of bits allocated to each of said first plurality of subcarriers, wherein:

said transmission unit of said first communication device transmits said first plurality of subcarriers to said second communication device with information regarding the number of bits allocated to each of said first plurality of subcarriers as notified, and said communication signal allocation unit allocates a plurality of said first plurality of subcarriers to each of said logic channels based on said measured line states and said set margin value of said logic channels.

6. A communication method in a communication system including a first communication device and a second communication device, the communication method comprising:

a step of said first communication device transmitting a first plurality of subcarriers having different frequencies to said second communication device;

a step of said second communication device measuring line states of said first plurality of subcarriers received from said first communication device;

a step of said second communication device allocating a plurality of said first plurality of subcarriers to each of a plurality of logic channels and setting a margin value for each of said logic channels to set the margin value for each of said first plurality of subcarriers as the margin value set for the logic channel to which it is assigned;

a step of said second communication device deciding the number of bits allocated to each of said first plurality of subcarriers such that an error rate of said logic channel on the subcarriers is less than a prescribed value in line states degraded by the margin value set for the subcarrier from the line state measured for the subcarrier;

a step of said second communication device notifying said first communication device by transmitting information regarding which of said logic channels each of said first plurality of subcarriers is allocated to and the decided number of bits allocated to each of said first plurality of subcarriers; and a transmission step of said first communication device transmitting said first plurality of subcarriers to said second communication device with the information regarding the number of bits allocated to each of said first plurality of subcarriers as notified, and a step of allocating a plurality of said first plurality of subcarriers to each of said logic channels based on said measured line states and said set margin value of said logic channels.

7. The communication method according to claim 6, wherein in said transmission step, said first communication device sets the presence or absence of an interleaving process and an interleave depth for each of said logic channels, performs an interleaving process for each of said logic channels based on said setting, and transmits subcarriers having different frequencies, where said subcarriers include logic channels, subjected to said interleaving process, to said second communication device at the number of bits allocated to each of said first plurality of subcarriers as notified.

* * * * *